US006968544B1

(12) United States Patent
Schneider

(10) Patent No.: US 6,968,544 B1
(45) Date of Patent: Nov. 22, 2005

(54) METHOD FOR TRANSFORMATION OF INTERFACE DEFINITIONS AND INTERMEDIATE FORMAT TABLES THEREOF

(75) Inventor: Claus Schneider, München (DE)

(73) Assignee: Infineon Technologies AG, Munich (DE)

( * ) Notice: Subject to any disclaimer, the term of this patent is extended or adjusted under 35 U.S.C. 154(b) by 1100 days.

(21) Appl. No.: 09/680,370

(22) Filed: Oct. 5, 2000

(30) Foreign Application Priority Data

Oct. 5, 1999 (DE) ................................ 199 47 892

(51) Int. Cl.[7] ................................................ G06F 9/45

(52) U.S. Cl. ...................... 717/146; 717/109; 717/110; 717/136; 707/102

(58) Field of Search ............................... 717/136, 146, 717/110, 109, 108; 707/102

(56) References Cited

U.S. PATENT DOCUMENTS

| | | | | |
|---|---|---|---|---|
| 5,513,119 | A * | 4/1996 | Moore et al. | 716/8 |
| 5,671,416 | A * | 9/1997 | Elson | 717/106 |
| 5,943,674 | A * | 8/1999 | Schofield | 707/104.1 |
| 6,519,755 | B1 * | 2/2003 | Anderson | 716/18 |
| 6,581,191 | B1 * | 6/2003 | Schubert et al. | 716/4 |

FOREIGN PATENT DOCUMENTS

| | | |
|---|---|---|
| DE | 44 08 106 A1 | 12/1994 |
| WO | WO 98/53413 | 11/1998 |

OTHER PUBLICATIONS

Dossis, Michael F; Noras, James M; Porter, Gary J; "Synthesis of Customised Hardware from ADA", p. 229-232, Circuits and Systems 1994, IEEE, retrieved Aug. 30, 2004.*

Hofmann, Klaus; Glesner, Manfred; Sebe, Nicu; Monolescu, A; Marco, Santiago; Samitier, Josep; Karam, Jean-Michel; Courto Bernard; "Generation of the HDL-A-model of a Micromembrane from its Finite-element-description", IEEE 1997, retrieved Aug. 30. 2004.*

Kreuzer, Werner; Gotschlich, Martin; Wess; Berhard; A Retargetable Optimizing Code Generator for Digital Signal Processors p. 257-260, 1996 IEEE, retrieved Aug. 30, 2004.*

Lamb, David Alex; "IDL: Sharing Intermediate Representations", p. 297-318, retireved Aug. 30, 2004.*

* cited by examiner

*Primary Examiner*—Tuan Dam
*Assistant Examiner*—Mary Steelman
(74) *Attorney, Agent, or Firm*—Laurence A. Greenberg; Werner H. Stemer; Ralph E. Locher

(57) ABSTRACT

A method for converting interface definitions within a source code program into an intermediate format includes identifying with a computer system objects in a source code program and interfaces in the objects. Interface properties are determined including an internal interface for producing a link from an object with interfaces located outside the source code program, and an input and/or output interface. Links are identified including an internal link between an interface and an input interface between identified objects, and an external link of an external interface. An intermediate format table is created having rows in a dimension, second rows in another dimension, and cells disposed at intersections thereof. Designation are assigned for each identified object to rows in the first and for each identified link to rows in the second. Designations for associated interfaces are inserted in the cells.

54 Claims, 2 Drawing Sheets

METHOD FOR TRANSFORMATION OF INTERFACE DEFINITIONS AND INTERMEDIATE FORMAT TABLES THEREOF

BACKGROUND OF THE INVENTION

Field of the Invention

The present invention relates to a method for converting interface definitions within a source code program into an intermediate format, and from an intermediate format table into object program code, and also relates to an intermediate format table which is suitable for this purpose.

So-called interfaces are used in programs in order to interchange data between individual program modules or program objects. Modellers/programmers of hardware descriptions naturally make particularly intensive use of interface definitions. Specific hardware description languages are used for this purpose, which describe the behaviour of the individual simulated components, and the electrical linking of the components to one another. In the field of hardware description languages, it is normal to subdivide the program code into an area which is used to define the architectures of the components, and into a second area which exclusively defines the interfaces between the components.

In order to allow data to be interchanged between different hardware development projects, it is necessary to translate program code from an original hardware description language into an object description language, so that these hardware simulators or hardware synthesis programs, which are used in another project, can be processed. Even in pure software projects, it may be necessary to translate between one programming language and another, for example to make it possible to run them on different hardware platforms. Typical examples of hardware description languages between which conversion may take place are VHDL and VERILOG. However, there are also other programming languages in the hardware description area, between which conversion may be necessary.

Direct conversion between programming languages is complex and susceptible to errors. It is thus possible that an object interface definition may no longer match the original interface definition, so that faults occur during the hardware simulation. Owing to the complexity not only of the original program code but also of the object program code, verification of the correctness of the conversion by a specialist is a task which is likewise difficult and susceptible to errors. Furthermore, a conversion program is required for each possible pair of programming languages between which conversion is intended to be carried out. With the large number of programming languages in which interface definitions play a role, this results in the need for a large number of converters with a high level of complexity.

SUMMARY OF THE INVENTION

The invention is thus based on the object of providing a translation system which can be used universally, whose construction is less complex, and which produces verifiable results. The invention includes a method for converting interface definitions within source code program into an intermediate format by a computer system that carries out the method, including the steps of identification of at least one object in the source code program, and identification of at least one interface in the at least one identified object. At least one of the identified interfaces may be an internal interface for producing a link from objects within the source code program and/or at least one of the identified interfaces may be an external interface for producing a link from an object with interfaces located outside the source code program. The at least one interface may be an input interface and/or an output interface. The method further includes identification of at least one internal link between at least one output interface and at least one input interface between at least two objects and/or identification of at least one external link of the at least one external interface. An at least two dimensional intermediate format table having rows arranged in a first dimension, having rows arranged in a second dimension, and having cells at the intersections of the first and second rows is created. The rows in the first dimension are assigned designations for each of the at least one identified objects. The rows in the second dimension are assigned designations for each of the at least one identified links. Designations for the output interface and/or input interface that is associated with both the respective identified object and the identified internal link are inserted in each of those cells that are located at the intersection of one of the rows in the first dimension with the designation of an identified object and one of the rows in the second dimension with the designation of an identified internal link, and/or the designations for the output interface and/or input interface that is associated with both the respective identified object and the identified external link are inserted in each of those cells that are located at the intersection of one of the rows in the first dimension with the designation of an identified object and one of the rows in the second dimension with the designation of an identified external link.

The invention further includes a method for converting interface definitions from an at least two-dimensional intermediate format table into object program code the intermediate format table having first rows arranged in a first dimension, second rows arranged in a second dimension and cells at the intersections of the first and second rows. Rows in the first dimension are assigned designations for at least one object. Rows in the second dimension are assigned designations for at least one internal link between the objects and/or at least one external link of an object. Designations for an internal output interface and/or internal input interface that is/are associated with both the respective object and the link are inserted in each of those cells that are located at the intersection of one of the rows in the first dimension with the designation of an object and one of the rows in the second dimension with the designation of an internal link, and/or in which designations for the external output interface and/or external input interface that is/are associated with both the respective object and the external link are inserted in each of those cells that are located at the intersection of one of the rows in the first dimension with the designation of an object and one of the rows in the second dimension with the designation of an external link. A computer system carries out the method with the steps of creating at least one program code object based on information, contained in the intermediate format table, about the at least one object. Associated internal output interfaces and/or internal input interfaces are assigned to their program code object. At least one link between program code objects is created based on the information, contained in the intermediate format table, about the internal links of the internal input interfaces and internal output interfaces; and/or associated external output interfaces and/or external input interfaces are assigned to their program code objects.

The invention also includes an intermediate format table which is suitable for converting interface definitions from an intermediate format table into object program code. The intermediate format table for storing interface information, which is contained in program code, in a computer system has at least two dimensions, rows arranged in a first dimension, rows arranged in a second dimension, and cells at the intersections of the first and second rows. Rows in the first dimension are assigned designations for at least one object in the program code. Rows in the second dimensions are assigned designations for at least one internal link between objects and/or designations for at least one external link of the program code. Designations for an output interface and/or input interface that is/are associated with both the respective object and the internal link are inserted in each of those cells that are located at the intersection of one of the rows in the first dimension with the designation of an object and one of the rows in the second dimension with the designation of an internal link, and/or designations for the output interface and/or input interface that is/are associated with both the respective object and the external link are inserted in each of those cells that are located at the intersection of one of the rows in the first dimension with the designation of an object and one of the rows in the second dimension with the designation of an external link.

Further advantageous refinements, aspects and details of the invention result from the dependent patent claims, the description and the attached drawings.

One aspect of the invention is aimed at conversion to and from an intermediate format in a tabular form.

The conversion is in this case carried out by means of a program in a data processing system.

A further aspect of the invention is aimed at an intermediate format which acts as a binding element between different conversion systems.

Yet another aspect of the invention is aimed at conversion systems whose intermediate results can be inspected and edited manually, despite automatic translation.

The methods according to the invention are carried out in a computer system and the intermediate format table is stored in a computer system, even when it can be printed out and/or displayed on a visual display unit. For the purpose of the present invention, a computer system is in this case regarded as any device which can carry out the methods according to the invention without human intervention (apart from starting the methods) and can generate the intermediate format table automatically. Suitable computer systems are, for example, personal computers, workstations, mainframe computers and lap top computers, etc.

For the purposes of the present invention, a program code is regarded as a sequence of instructions in a specific programming language, which instructions are functionally related. For the purposes of the present invention, a source code program is a code which is used as the basis for conversion to another program code, which is then referred to as the object program code.

For the purposes of the present invention, an object in the source code program is an associated sequence (contained in the program code) of instructions in a programming language. In the context of hardware programming languages, an object can be equated to the definition of a hardware component. In the context of such programming languages, in which interface definitions appear in an autonomous part of the program code, an object may also be regarded as the sum of the interface definitions of a component of the hardware to be simulated.

For the purposes of the present invention, an interface is regarded as an input or output via which data are passed backward and/or forward between objects, for example via global variables or in some other way.

For the purposes of the present invention, an internal interface is an interface which produces a link between two objects within a program code.

For the purposes of the present invention, an external interface is used to produce a link from one object within the program code to interfaces (which are located outside the program code) of other objects, for example if, on the basis of the modular construction of a hardware simulation, different parts of program code are used which are linked to one another via such external interfaces.

Interfaces may be input interfaces or output interfaces, depending on the direction of the data flow, in which case it is likewise possible for one interface to carry out both the functions of an input interface and an output interface at the same time. In certain description languages, it is also possible to define interfaces whose information flow direction is not defined, that is to say is indeterminate.

For the purposes of the present invention, an internal link is accordingly the link produced between two internal interfaces. In hardware simulations, this may also be referred to as a signal and, in fact, then simulates an electrical line between two hardware components.

In a corresponding way, an external link is a link between an external interface and an interface which is located outside the program code under consideration.

The term link in this context refers to relationships in which an internal link and/or an external link can be produced.

First of all, the invention is aimed at a method for converting interface definitions within source code program into an intermediate format by means of a computer system, which carries out the method, comprising the following steps:

A.: Identification of at least one object in the source code program;

B.: Identification of at least one interface in the at least one identified object;

wherein at least one of the identified interfaces may be an internal interface for producing a link from objects within the source code program and/or at least one of the identified interfaces may be an external interface for producing a link from an object with interfaces located outside the source code program; and wherein the at least one interface may be an input interface and/or an output interface;

C.: Identification of at least one internal link between at least one output interface and at least one input interface between at least two objects and/or Identification of at least one external link of the at least one external interface;

D.: Creation of an at least two-dimensional intermediate format table having rows arranged in a first dimension, having rows arranged in a second dimension, and having cells at the intersections of the first and second rows, wherein rows in the first dimension are assigned designations for each of the at least one identified object;

wherein rows in the second dimension are assigned designations for each of the at least one identified links; and wherein, designations for the output interface and/or input interface which is associated with both the respective identified object and the identified internal link are inserted in each of those cells which are located at the intersection of one of the rows in the first dimension with the designation of an identified object and one of the rows in the second dimension having the designation of an identified internal link; and/or wherein, designations for the output interface and/or input interface which is associated with both the respective identified object and the identified external link are inserted in each of those cells which are located at the intersection of one of the rows in the first dimension with the designation of an identified object and one of the rows in the second dimension having the designation of an identified external link.

For the purposes of the present invention, an assignment should in this case be understood as meaning that a row is provided for the purpose of containing information about the characteristics assigned to it, for example of an object or of a link, without any of the cells in the row necessarily having a corresponding designation or identification.

For the purposes of the present invention, insertion means that, in fact, a detail, of whatever type, is also always written into the cell in a row, or into the cell where two rows intersect, so that the corresponding cell has a content.

An interface may in this case also at the same time have the function of an input and output interface, or may be an interface with an undefined data flow direction.

Each link is in this case assigned a row in the second dimension, while each of the identified objects in the source code program is assigned a row in the first dimension, which process is carried out by assigning the designation of the link or of the object to the row.

The method according to the invention thus produces an intermediate format table, in a similar way to the commercially available table processing programs, in which a first dimension, for example in the transverse direction, is assigned designations for identified objects. In this case, such rows may be regarded as columns. Each column is thus used to accommodate interface definitions for an object. The identified links between the objects are entered in the second dimension, for example the lines in a table. This results in a grid, which in this case is two-dimensional, with cells. The term "designations" should in this case be understood to mean unique allocation of names which are used to subsequently relocate an object, an interface or other elements. The designations may comprise names selected arbitrarily by the conversion program or numbers from 1 to n for each of the identified objects found (where n is the total number of objects identified); or this may be done in some other suitable way.

The table is stored in a suitable format in an electronic, magnetic, optical or other suitable form in the computer system. It may also be output on a printer, for documentation purposes.

In the simplest case, this is a two-dimensional table, which is selected as the intermediate format. This allows the information stated above to be presented and stored via the interface definitions. However, it is also feasible to obtain further information via the interfaces, for example about the type (associated with an object) of components simulated by the object, when this relates to a hardware description language. Such further characteristics of individual interfaces can be represented in a third or further dimension.

The simplest cases of convertible program code are those in which it is possible to identify only one object in the program code which has one or more external interfaces, as well as program code which has two objects which are linked to one another via an internal link. In order to allow these two simplest possibilities to be converted, it is necessary to provide alternatives in the method, which can identify either external or internal, or both types of interfaces. Even when the cells in the table are occupied with the rows being assigned, both of the simplest possibilities must be considered alternatively and cumulatively.

The method according to the invention leads to an intermediate format table which contains all the interface definitions which are contained in a program code in a data format which is clearly broken down and is accessible in a standard manner by other conversion programs. The two-dimensional representation also allows an operator or programmer to visually inspect the resultant intermediate format, thus providing an intervention capability, in a simpler way than would be possible without any intermediate format or by using a conventional representation with block diagrams.

The method can be further refined if at least one external link has been identified. A first specific row in the first dimension is preferably used to indicate the mode of the external interface for the at least one identified external link, with details of the mode of the external interface for the at least one identified external link being inserted in each of those cells which are located at the intersection of the first specific row in the first dimension and the rows in the second dimension with the designations of the at least one identified external link.

With regard to the mode, the method can be distinguished by the fact that the external interface may be an input interface, an output interface, a bidirectional interface or an interface with an undefined flow direction.

Such a detail can be defined, for example, by means of a numerical code, in which case 0 may represent an input interface, 1 an output interface, or vice versa, or by using suitable expressions such as in, out, in/out.

In addition, it is possible to define the data types of the at least one identified interface, in which case at least one second specific row in the first dimension is assigned details of the data types of the at least one identified interface, and designations for the data types associated with the at least one identified link are inserted in each of those cells which are located at the intersection of the second specific row and the rows in the second dimension having the designations of the at least one identified link.

The term data types is used in a general way in data processing in order to identify the fact that values of variables are interpreted in a specific way by the compiler or the interpreter, in order to make it possible to take account of different types of data. Typical data types are binary data, which may have only the values 0 and 1, integer numbers, that is to say whole numbers, floating-point numbers, in which there is at least one decimal point, and characters, in which letters or letter sequences are processed, etc. This definition of data types will also be used in the present invention. In general, it must be assumed that an identified interface has only one data type. However, in the above formulation, the plural was chosen since, generally, a number of identified interfaces may be present. In precisely the same way as above, the designation should in this case be regarded as the allocation of a name, in which case one or more names may be used for the data types. In this case as well, the designation may be stated as a numerical code, in which case each number is intended to indicate a specific data type, or in plain text, for example by the statement "bit", "boolean", "character", "integer", etc., which can be written directly into the cells.

A further approach which is taken into account by the invention is for the details of the data type of a link also (or exclusively) to be formulated as a component of the designation of an interface (external or internal). This option will be described further below.

Interface definitions, in particular in hardware description languages, may comprise not only the actual interfaces, that is to say the links between objects in a program code and/or external objects, but also describe the details of constants which are used within the program code, since these may be critical to the behaviour of components without having to be defined within the components. They are thus naturally located in the interface definition. For the purposes of the present invention, the conversion of constants should thus also be regarded as conversion of interface definitions.

For the purposes of the present invention, an external constant should be regarded as a constant which, although being declared within a program code, is not necessarily defined, that is to say provided with a numerical value, however. Generally, a numerical value is allocated to the external constants by parts of the program which are outside the program code under consideration. Such an external constant is referred to, for example in VHDL, as being "generic". Such a generic is declared within a so-called "entity", that is to say that region of program code in VHDL in which interfaces of a component are declared (entity or component). On the other hand, an internal constant should be regarded as a constant which must not only declared by also defined within the program code. The present invention refers generally to constants when internal and/or external constants come into question.

The method according to the invention thus preferably includes the situation where, in addition, at least one internal constant is identified in the at least one identified object and/or at least one external constant which can be used by all objects in the source code program, the data type of the at least one identified internal constant and/or external constant is defined, at least one third specific row in the first dimension is assigned details of the data type of the at least one constant, at least one first specific row in the second dimension is assigned designations of the at least one identified internal constant and/or external constant, and designations for the data type associated with the at least one identified constant are inserted in each of those cells which are located at the intersection of the at least one third specific row and of the at least one first specific row in the second dimension with designations of the at least one identified constant.

In this case as well, each of the identified constants is assigned one of the first specific rows in the second dimension, in order to make it possible to produce a unique association between the variables recorded in the table and the constants (as, in general, also to the links).

In this way, it is possible to allow correct constant definition and thus correct interpretation of a value associated with a constant when the constants are subsequently converted in an object program code.

Provided this is possible using the particular program code, it is sensible for the exact details of constants also to include their value and, if known, a method of calculating the constants.

A method of calculating a constant in this case means a program code, when executed during the running of a program, results in the determination of the value to be assigned to a constant. The calculation of a constant is merely a more complex way of assigning a value to the constant.

The method is thus preferably also aimed at a value or a method of calculation of the at least one identified constant and/or external constant also being defined; at least one fourth specific row in the first dimension is assigned details of the value or of the method of calculation of the at least one constant, and the value or the method of calculation of the at least one identified constant is inserted in each of those cells which are located at the intersection of the at least one fourth specific row and the first specific rows in the second dimension with designations of the at least one identified constant. In this case as well, the scope of the intermediate format table may advantageously be limited by the at least one fourth specific row at the same time being the at least one first specific row (in the first dimension).

Alternatively, details of the value or method of calculation of a constant can also be inserted at the intersection of the first specific row (which is assigned to the constant) with one of the rows in the first dimension with designations for the identified objects. This allows a better association to be achieved between constants which have not been defined in a general part of the source code program but which are defined in a specific program code object. This maintains the association between a constant and a program code object in which it has been defined.

In addition to the constants, the identified links may also have a value or a method of calculation which is assigned to them at the start of a program run. The method according to the invention is thus preferably distinguished in that, in addition, a value or a method of calculation is defined for the at least one identified link;

- at least one fifth specific row in the first dimension is assigned details of the value or of the method of calculation of the at least one identified link; and
- in which case, the value or the method of calculation of the at least one identified link is inserted in each of those cells which are located at the intersection of the at least one fifth specific row and one of the rows in the second dimension with the designation of an identified internal link and/or of the rows in the second dimension with the designation of an identified external link.

In the method according to the invention, as it has been defined and outlined so far, objects, links, constants and interfaces are assigned designations and, in some cases, these are also inserted in cells, without any indication having been given as to how the designations are generated.

It is possible for the designations to be assigned automatically in accordance with internal criteria by the program carrying out a conversion process.

However, a method is preferred which has the further step of:

- Identification of the original designations which the at least one object, the at least one link and/or the at least one constant have in the source code program, wherein specific title rows are assigned details of the identified original designations and the original designations are inserted into cells in the title rows.

It is sensible, of course, to carry this insertion process in such a way that insertion in each case takes place into those cells which are located at the intersection of the title rows with the object, link or constant rows which are associated with the respective designating object.

The cells with the designations of the internal interfaces or of the external interfaces may also contain other information about the interface, in addition to a simple identification of the interface in the form of a name.

The designations of the at least one interface may accordingly be compiled from an identifier for the respective interface and at least one detail which is selected from an identification of the mode of the interface, of the data type of the interface, of a default value and the details of a data type conversion function to be applied to the interface. In this way, in addition to identification in the form of a name, further information about the interface can also be obtained at the same time from the intermediate format table.

In this context, an identifier should be regarded as an interface identification in the form of a name, for example an arbitrary assigned name, a number or some other allocation of a name which is suitable for distinguishing it from other interfaces.

As defined above, the mode of an interface is an identification of the behaviour of the interface with regard to the input and output of signals or data. An interface may in this case have a mode which makes it an output interface, an input interface, a bidirectional interface or an interface with an undefined flow direction.

With reference to what has been stated above, the data type of the interface may, for example, be a binary value, an integer number or the like.

A default value is a value which an interface is intended to assume when no other value has been defined and the program is in the initial state.

A data type conversion function is required when it is intended to link two interfaces to one another whose data types differ from one another. In a case such as this, the data type conversion function converts the data item for the output interface into a data item which corresponds to that of the data type of the input interface.

The information which can also be stated in the designation of the interfaces may be stated individually or more than once, in which case the individual details may be separated from one another by, for example, commas or other separating symbols, or in which case the details are represented in some other form which is suitable for automatic processing.

The method according to the invention may also have the following further step of, in a corresponding way to that for objects, links or constants:

Identification of the original designations which the at least one interface has in the source code program;

Use of the original designations as identifiers.

In principle, the method according to the invention is suitable for converting any desired source code program into an intermediate format table. However, it is particularly preferred for the source code program to be a code in a hardware description language, in particular one of those hardware description languages in which the interface definitions are in the form of an autonomous program code. The use of the method according to the invention is, in principle, possible with conventional programming languages or with hardware description languages in which no such separation is carried out. However, the level of complexity for analysis of the source code program increases. Accordingly, an object is preferably an interface entity of an electronic component, representing said component. Furthermore, the at least one internal link represents a signal which is produced between two electronic components. The at least one external link may preferably represent a so-called port.

The method which has been described so far for converting interface definitions leads to an intermediate format table which, in general, may contain only information about one level of a source code program, that is to say about objects which are adjacent to one another and are carried out virtually simultaneously, for example as simultaneously running processes in a hardware simulation. However, a source code program may also reach a higher level of complexity by the code being interleaved by means of branches or other references, for example being broken down into different levels. One already mentioned example is the reference to data type conversion functions as part of the designation of interfaces, which may itself refer to the program code outside the actual interface definition. Furthermore, objects in the source code program may in turn have been defined by a source code program which is held separately from this.

In order to make the method according to the invention and the resultant intermediate format tables accessible to such cross-references as well, the method according to the invention can preferably be distinguished in that at least one of the identified objects contains a sub source code program in it, which can likewise be converted into an intermediate format; and in that, once a sub source code program has been converted into a sub format table, a cross-reference to the sub format table is inserted in a cell in the row in the first dimension which is associated with the converted object. Any desired cell which has not yet been assigned any other function may be used for this purpose, or rows in the other dimension are attached in a corresponding manner, resulting in further cells which can be used for this purpose.

The method according to the invention can also be modified such that a cross-reference to at least one identified object which is stored as a separate unit as source code program is inserted in a cell in the row in the first dimension which is associated with the stored object. This thus results in a departure from the area of pure interface definitions, since a direct reference to the source code program is produced. This cross-reference may be useful if, during the further conversion to the object program code, it is not just the interface definitions which are converted by the reformatting program, but also the program code which provides the objects. In this case, the program can use the cross-references mentioned above to produce a direct relationship between the interface definitions of an object and its functionality.

In order to keep the size of the intermediate format table compact, it may be preferable to combine certain rows with one another so that only one row need be used instead of two. This bundling can be carried out wherever one row in one dimension has entries only in those cells in which no cells with values appear in the other row to be bundled. It is thus possible, for example, for the at least one third specific row to be the at least one second specific row at the same time. Thus, in this case, one row in the first dimension is used to accommodate different variables in it. This can be done by subdividing the row such that, for example, two different areas one above the other in the row carry out the different functions, or areas of the row located side by side, where the individual cells are arranged in a row side by side. Further examples of bundling are the combination of the fourth specific row with the first specific row, or the fourth specific row with the fifth specific row.

Once the interface definitions in a source code program have been converted according to the invention into an intermediate format table, such a table is available in the computer system, which is easy to read or to inspect visually after being printed out or by being displayed on a visual display unit and which, if required, can be manually corrected or modified by action by a programmer and which, according to the invention, can be used as the initial basis for an interface definition for an object program code. With regard to the advantages, effects and aspects of the method for conversion of an intermediate format table into an object program code, reference is made to the above statements and to the complete contents of this document.

Accordingly, the invention is likewise aimed at a method for converting interface definitions from such an at least two-dimensional intermediate format table having first rows arranged in a first dimension, second rows arranged in a second dimension and cells at the intersections of the first and second rows, in which rows in the first dimension are assigned designations for at least one object, in which rows in the second dimension are assigned designations for at least one internal link between the objects and/or at least one external link of an object, and in which designations for an internal output interface and/or internal input interface which is/are associated with both the respective object and the link are inserted in each of those cells which are located at the intersection of one of the rows in the first dimension with the designation of an object and one of the rows in the second dimension with the designation of an internal link, and/or in which designations for the external output interface and/or external input interface which is/are associated with both the respective object and the external link are inserted in each of those cells which are located at the intersection of one of the rows in the first dimension with the designation of an object and one of the rows in the second dimension with the designation of an external link, by means of a computer system which carries out the method, into an object program code, with the steps described below.

The above definition specifies an elementary intermediate format table. This method according to the invention has the following steps:

- Creation of at least one program code object on the basis of information, contained in the intermediate format table, about the at least one object;
- Assignment of associated internal output interfaces and/or internal input interfaces to their program code objects;
- Creation of at least one link between program code objects on the basis of the information, contained in the intermediate format table, about the internal links of the internal input interfaces and internal output interfaces; and/or
- Assignment of associated external output interfaces and/or external input interfaces to their program code objects.

For the purposes of the present invention, a program code object can be regarded as an object, written in a program code, which is generated as part of the object program code by means of the method according to the invention.

As has already been described with regard to the method according to the invention for converting interface definitions in the context of source code programs into an intermediate format, a person skilled in the art will also be familiar, in the case of the method according to the invention, with how he can extract information contained in the intermediate format table such that conversion to an object program code is possible.

By way of example, the automatic program which is suitable for this purpose can first of all determine the individual defined objects in the rows in the first dimension on the basis of the predetermined designations, and can then determine constants as well as internal and external links within the rows, and can assign the interfaces quoted at the intersections to these constants and links.

At least one second specific row in the first dimension of the intermediate format table is preferably assigned details of the data types of the at least one interface, and designations for the data types which are associated with at least one link are inserted in each of those cells which are located at the intersection of the second specific row and rows in the second dimension with the designations of the at least one link, in which case this further development has the further step of: definition of the data types of the at least one interface which is assigned to the at least one program code object and is associated with the at least one link.

As explained above for the purposes of the invention, an interface definition should also be regarded as meaning the definition of constants which are used by different objects. The method according to the invention can thus advantageously be distinguished in that at least one third specific row in the first dimension of the intermediate format table is assigned details of the data types of at least one constant in at least one object and/or at least one external constant, which details can be used by all the objects, at least one first specific row in the second dimension is assigned designations of the at least one constant and/or at least one external constant, and designations for the data types associated with the at least one constant are inserted in each of those cells which are located at the intersection of the at least one third specific row and the at least one first specific row in the second dimension with designations of the at least one constant; having the further step of: definition of at least one internal constant and/or of at least one external constant in the at least one program code object and/or in a general part of the object program code.

Furthermore, at least one fourth specific row in the first dimension of the intermediate format table may be assigned details of a value or a method of calculation of the at least one internal constant and/or of the at least one external constant, and the value or the method of calculation of the at least one constant can be inserted in each of those cells which are located at the intersection of the fourth specific row and the first specific rows in the second dimension with designations of the at least one constant, in which case this further development has the further step of: assignment of the value or of the method of calculation of the at least one constant to the at least one constant defined in the program code.

The method according to the invention can furthermore be distinguished in that at least one fifth specific row in the first dimension in the intermediate format table is assigned details of the value or of the method of calculation of the at least one link; and the value or the method of calculation of the at least one link is inserted in each of those cells which are located at the intersection of the at least one fifth specific row and one of the rows in the second dimension with the designation of an internal link and/or of the rows in the second dimension with the designation of an external link;

having the further step of:

- Assignment of the value or of the method of calculation of the at least one link to the link created in the object program code.

Furthermore, specific title rows in the intermediate format table may preferably be assigned details of the designations of the at least one object, of the at least one link and/or of the at least one constant, in which case the designations are inserted in cells in the title rows and the method has the further step of: naming of the at least one program code object, of the at least one link and/or of the at least one constant on the basis of the designations in the cells in the title rows in the intermediate format table.

The corresponding objects, links and/or constants in the object program code are thus given the same designations which they already had in the source code program before conversion into an intermediate format table.

The method according to the invention can furthermore be distinguished in that a cross-reference to a sub format table is inserted at least in one cell in a row in the first dimension which is associated with an object, having the further step of: linking of the program code object produced from the object to the sub program code produced from the sub format table.

The method can also be distinguished in that a cross-reference to a source code program which is stored as a separate unit is inserted at least in one cell in the row in the first dimension which is associated with an object, having the further step of: linking of the program code object produced from the at least one object to the source code program which is stored as a separate unit.

As has already been stated with reference to the method for converting a program code into an intermediate format table, it may be worthwhile in order to keep the size of the intermediate format table compact to combine certain rows with one another so that only one row need be used instead of two. This bundling can also be taken into account during the process of conversion into an object program code.

The present invention covers not only the methods for converting program code but also the specific configuration of the intermediate format table. For example, rows in the table contain all the signals and constants of the architecture and all the ports and generics of the entity, where this relates to representations in a hardware description language. The secondary statements, such as component instantiation, process, competing signal assignment etc., are listed in the rows in the remaining dimension. The intermediate format table clearly shows which components are linked to which signals of what type, and what the signal flow direction is. On the other hand it can be seen at a glance which components are linked to a specific signal, that is to say who generates the signal and who reads it. With regard to the advantages, effects and aspects of the intermediate format table in the present invention, reference is made to the above statements and to the entire contents of this document.

In consequence, the invention is also aimed at an intermediate format table for storing interface information, which is contained in a program code, in a computer system, having at least two dimensions; having rows arranged in a first dimension, rows arranged in a second dimension and cells at the intersections; in which case rows in the first dimension are assigned designations for at least one object in the program code, in which case rows in the second dimension are assigned designations for at least one internal link between objects and/or designations for at least one external link of the program code, and in which case designations for an output interface and/or input interface which is/are associated with both the respective object and the internal link are inserted in each of those cells which are located at the intersection of one of the rows in the first dimension with the designation of an object and one of the rows in the second dimension with the designation of an internal link, and/or designations for the output interface and/or input interface which is/are associated with both the respective object and the external link are inserted in each of those cells which are located at the intersection of one of the rows in the first dimension with the designation of an object and one of the rows in the second dimension with the designation of an external link.

A first specific row in the first dimension is preferably used to indicate the mode of an external interface for the at least one external link. In this case, details of the mode of the external interface for the at least one external link are inserted in each of those cells which are located at the intersection of the first specific row in the first dimension and the rows in the second dimension with the designations of the at least one external link. As has already been mentioned above, an interface may also be an input interface, an output interface, a bidirectional interface or an interface with an undefined flow direction in this case as well.

Furthermore, details of the data types of the at least one interface may be assigned in the intermediate format table of at least one second specific row in the first dimension, and designations for the data types associated with the at least one link may be inserted in each of those cells which are located at the intersection of the second specific row and the rows in the second dimension with the designations of the at least one link. In this case, a link covers both internal and external links.

The intermediate format table preferably also contains at least one third specific row in the first dimension which is assigned details of the data types of at least one internal constant and/or of at least one external constant from the program code, first specific rows in the second dimension, which are assigned designations of the at least one internal constant and/or of the at least one external constant, in which case designations for the data types associated with the at least one constant are inserted in each of those cells which are located at the intersection of the third specific row and the first specific rows in the second dimension with designations of the at least one constant. The at least one third specific row is at the same time preferably also the at least one specific second row in this case as well.

In the intermediate format table, at least one fourth specific row in the first dimension can furthermore be assigned details of a value or of a method of calculation of the at least one constant, and the value or the method of calculation of the at least one constant can be inserted in each of those cells which are located at the intersection of the at least one fourth specific row and the first specific row in the second dimension with designations of the at least one constant.

The intermediate format table according to the invention may be distinguished in that at least one fifth specific row in the first dimension is assigned the details of a value or of a method of calculation of the at least one link; and the value or the method of calculation of the at least one link is inserted in each of those cells which are located at the intersection of the at least fifth specific row and one of the rows in the second dimension with the designation of an internal link and/or the rows in the second dimension with the designation of an external link.

It is also true for the intermediate format table according to the invention that specific title rows can be assigned details of the original designations which the at least one object, the at least one link and/or the at least one constant have in the program code, and the original designations are inserted into cells in the title rows.

The term program code in this case should be regarded as a source code program which is correlated with the intermediate format table as a result of the fact that said table has been generated from this code. The designations of the at least one input interface and/or the at least one output interface can also be composed of an identifier for the respective interface and of at least one detail which is selected from an identification of the mode of the interface, of the data type of the interface, of a default value and of the details of a data type conversion function to be applied to the interface.

The intermediate format table according to the invention may contain further information. In hardware description languages, it is thus normal to use comments not only to explain situations but also to transmit instructions relating to analysis tools or synthesis programs which are outside the actual program code (so-called pragmas) and for which no constructs are provided in the programming language being used. Information about the timing of a program, which could likewise be included only in comment form in the program code, can also be converted in this way, and can be used by appropriate tools. The conversion program which produces the intermediate format table can also add further information which has resulted from the analysis of the initial program code and can help to resolve ambiguities in the intermediate format table. Such information, and other information, can also be used as instructions for controlling the conversion sequences by the conversion program which converts the intermediate format table back to the program code. It is also feasible for such information to be used by a user. All the information items described above are referred to as annotations in the following text.

The intermediate format table according to the invention can thus be distinguished in that any desired cells in the intermediate format table may contain annotations which may be used to control programs to analyze the information contained in the intermediate format table, and/or for information for a user.

The practical conversion of annotations can be achieved in that at least one further dimension in the intermediate format table is allocated to the annotations, wherein rows in the further dimension are assigned specific types of annotations, and an annotation which is to be used is used at the intersections of the rows in the first and second dimensions which govern the annotation with the row in the further dimension which is assigned to the type of annotation to be used.

The intermediate format table according to the invention can be modified either during its production or during the subsequent course of processing, in a wide range of ways. In order to improve clarity, signals and/or links may be combined to form groups, which are always used in the same way at the interfaces of the objects (for example parallel blocks). There is no correspondence for these signal groups, so-called bundles, for example in a hardware programming language such as VHDL, to allow them to be extracted in a corresponding manner from an VHDL description. So-called concurrent statements (which can be used as alternatives) could also be grouped in the same column. When using VHDL, this corresponds to a so-called block.

The usefulness of the table can be further increased by interactively re-sorting rows in the first dimension and rows in the second dimension, such that, for example, after the selection of a row in the second dimension, the associated columns may be arranged such that they are directly adjacent in order to make it possible to analyze the links of the selected object better. Other sorting criteria can also be applied to an intermediate format table according to the invention, for example an alphabetic arrangement, an arrangement which is sorted on the basis of a prefix or postfix, an arrangement based on the type of operation of the external links, an arrangement based on the data type used for the link, and a sequence such as that which is carried out in the original source code program. It is thus possible in the table according to the invention to allow rows to be masked out interactively in order to improve the clarity.

It is also possible to carry out manipulations in the intermediate format table which would lead to code transformation during subsequent conversion into an object program code. Examples of such transformations may be:

- Grouping, that is to say production of a new table with grouped objects and with the original rows associated with them being compiled to form a new row,
- Regrouping, that is to say replacement of an original row by the rows of a further intermediate format table at a lower hierarchical level, which the original row originally referred.

DESCRIPTION OF THE PREFERRED EMBODIMENT

Figure 1:
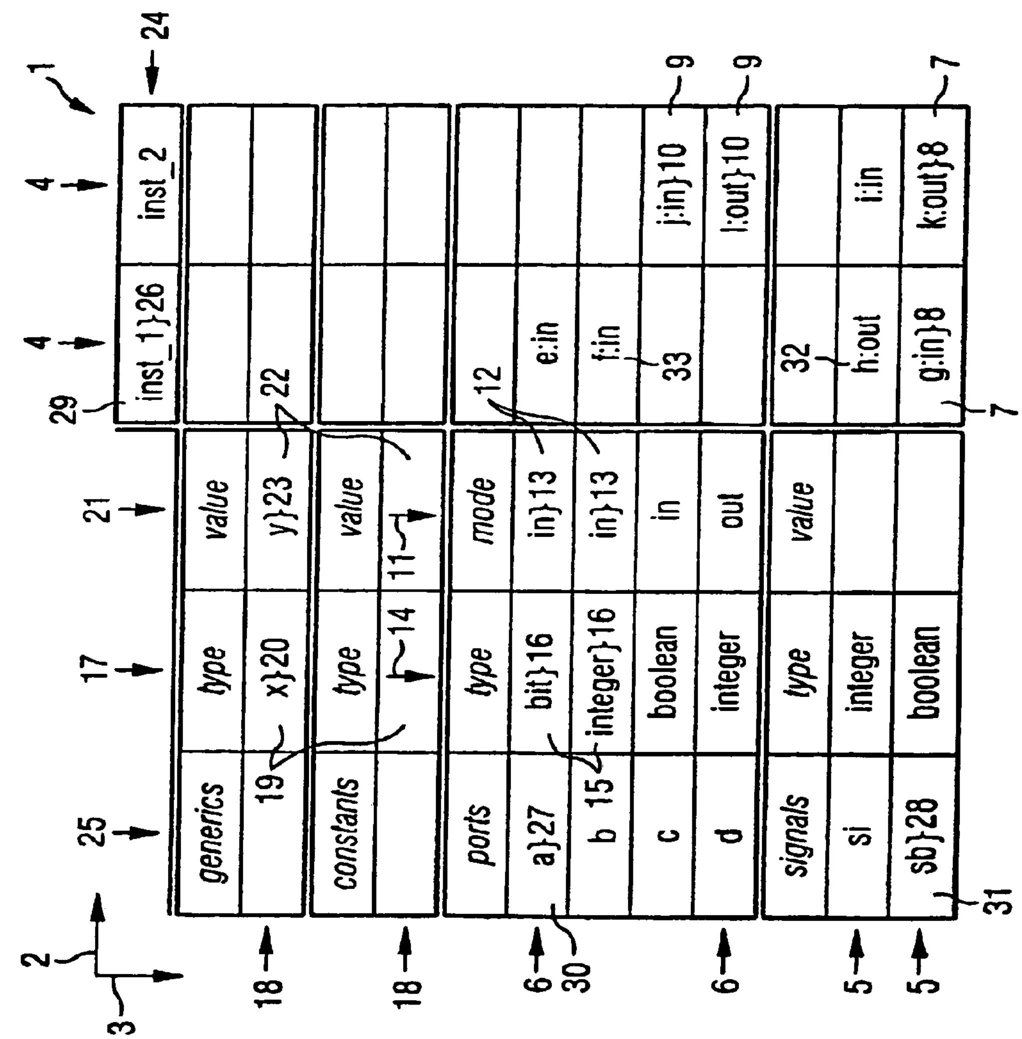
FIG. 1 is an embodiment of an intermediate format table produced from a first exemplary program according to the invention.

In all the figures of the drawing, sub-features and integral parts that correspond to one another bear the same reference symbol in each case.

In the following text, two examples will be used to illustrate how program code can be converted into an intermediated format table, with reference made to the drawings.

The further first, simple exemplary program:

```
entity top is
    port ( a : in bit;
        b : in integer;
        c : in boolean;
        d : out integer );
    end top;
architecture arch of top is
    component comp_1
        port ( e : in bit;
            f : in integer;
            g : in bit;
            d : out integer );
    end component;
    component comp_2
        port ( i : in integer;
            j : in boolean;
            k : out bit;
            l : out integer );
    end component;
    signal si : integer;
    signal sb : bit;
begin
    inst_1 : comp_1
        port map( e => a,
            f => b,
            g => sb,
            h => si );
    inst_2 : comp_2
        port map( i => si,
            j => c,
            k => sb,
            l => d );
end arch;
```

shows two program objects inst_1 and inst_2 of the comp_1 and comp_2 type, each having four interfaces. The two objects are linked to one another by the two links (signals) si and sb via the interfaces h and i, and g and k respectively.

Furthermore, inst_1 also has two external interfaces f and e, which are used by the external links b and a; inst_2 [lacuna] the external interface j of the link c and 1 of the link d.

These interfaces are defined in the exemplary program code, together with their function as an input or output interface and the data types used for them.

FIG. 1 shows an intermediate format table 1 which results from use of the method according to the invention for converting interface definitions into an intermediate format. The example of an intermediate format in table 1 has a first dimension in the direction of the arrow 2, and a second dimension in the direction of the arrow 3. First of all, two rows in a first dimension 4 are defined, to which the designations of the objects inst_1 and inst_2 are assigned. In the second dimension 3, the rows are assigned to a second dimension 5 for internal links. Designations 8 for the various internal interfaces are now entered in the resultant intersection cells 7. To assist clarity, the rows in the first and second dimensions may also be explicitly assigned in a secondary way to designations. This is done by means of title rows 24 and 25. Designations for the objects 26 are entered in the title row 24, in cells provided for this purpose for the designation of an object 29. These designations for internal links 28 are entered in the title row 25, in cells provided for this purpose for designations of an internal link 31. As can be seen, designations 8 are entered in the cells 7, which designations 8 contain an identifier 32 of an internal interface, namely its original designation in the exemplary program code and an identification as to whether this is an output interface (out) or an input interface (in). Rows in the second dimension 6 are also provided in the table, for external links. The interfaces which are used for external links are entered, with their designations 10, in cells 9 at the intersections of these rows 6 with the rows in the first dimension 4. In this case as well, the designation comprises an identifier 33 as well as details about the character of the interfaces as input or output interfaces. The original designations 27 of the external links in cells 30 are entered in the title rows 25. In addition, details for the presence of an input interface or of an output interface for the external links are entered in a first specific row 11 at the intersections with the rows in the second dimension for external links 12.

The data types of the links are also stated in the exemplary intermediate format table 1. A second specific row 14 is used for this purpose, whose cells 15 at the intersections with the rows in the second dimension for external links 6, and also with the rows in the second dimension for internal links 5, each details 16 of the data type of the respective link. The normal data processing terms are used for this purpose, such as bits, integers, boolean, etc.

The upper area of this two-dimensional intermediate format table 1 is reserved for details of constants in the exemplary program code. Since no constants are defined in the stated exemplary program code, the letters x and y have just been inserted here for illustration purposes. First specific rows in the second dimension 18 are used for details of the constants, and a third specific row 17 in the first dimension is used for details of the data type, with a fourth specific row 21 in the first dimension being used for details of the value of the constants. The values for external (top) and internal (bottom) constants X are entered in the intersection cells 19 in the third specific rows 17 and in the specific rows in the second dimension 18, as is denoted by the reference symbol 20. Values of the constants which are present are entered in cells 22 as y (23) at the intersections between the fourth specific row and the first specific rows in the second dimension 18.

The following second exemplary program is an expanded version of the first exemplary program.

```
entity top is
        generic( y : integer := 3);
        port ( a : in bit;
                b : in integer;
                c : in boolean := true;
                d : out integer );
end top;
architecture arch of top is
        component comp_1
        generic( x : integer := 4);
        port ( e : in bit;
                f : in integer := 7;
                g : in bit;
                d : out integer);
        end component;
        component comp_2
                generic( z : integer);
                port ( i : in integer;
                        j : in boolean;
                        k : out bit;
                        l : out integer );
        end component;
        constant ci : integer := y + 5;
        signal si_1, si_2 : integer;
        signal sb : bit := '1';
        function boolean2bit(arg : boolean) return bit
        is
        begin
                return bit'val (boolean'pos(arg));
        end boolean2bit;
begin
        p0 : si_2 <= si_1 + ci;
        inst_1 : comp_1
                port map ( e => a,
                        f => b,
                        g => sb,
                        h => si_1 );
        inst_2 : comp_2
                generic map ( z => y)
                port map ( i => si_2,
                        j => boolean2bit(c),
                        k => sb,
                        l => d );
end arch;
```

In this case, various constants are defined in the general part of the program and in the individual program objects.

In addition, a further object p0 is also defined, in addition to the two objects inst_1 and inst_2 as component representatives. Finally, a data conversion function boolean2bit is likewise provided, which converts the input data on the external interface "j".

Figure 2:
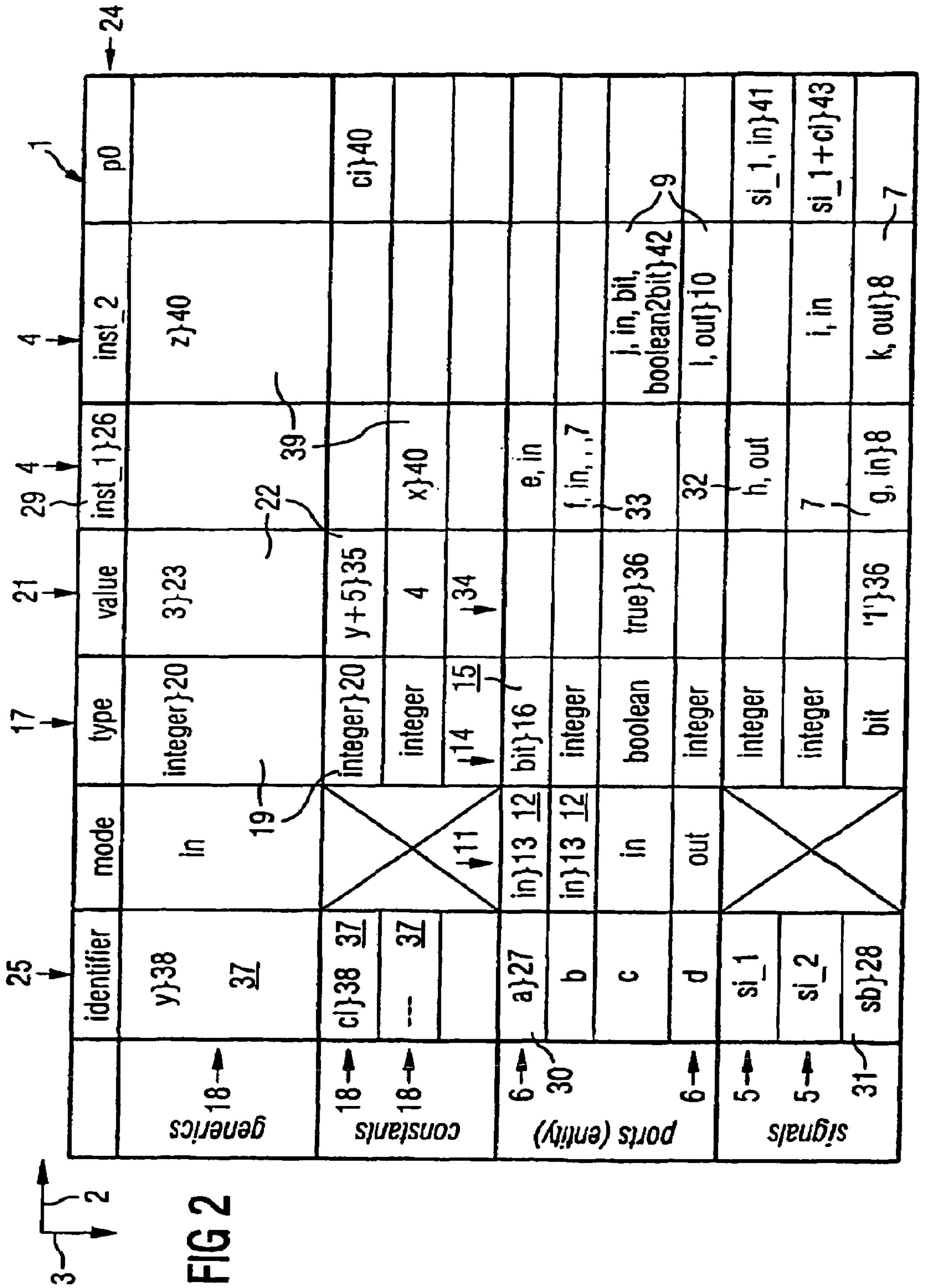
FIG. 2 is a further embodiment of the intermediate format table of FIG. 1 produced from a second exemplary program according to the invention.

FIG. 2 shows an intermediate format table according to a further embodiment of the present invention, in which a representation format which differs from that in the table in FIG. 1 has been used. The reference symbols used for FIG. 1 are also used with the same meanings with respect to FIG. 2.

In particular, the bundling of specific rows in the first dimension has been carried out differently in this case. The table is less compact than that shown in FIG. 1.

In FIG. 2, not only have values 23 of the constants and the method of calculation 35 of the constant ci been entered in a fourth specific row 21, but the values 36 of interfaces in a fifth specific row 34 have also been entered. The fourth specific row 21 is in this case the fifth specific row 34, at the same time.

The constants used in this example are inserted, with their designations 38, in cells 37 provided for this purpose in the specific rows 18 in the second dimension 3 which are located at the intersection with the title row 25. An external constant x, which is declared only within a component declaration (and is immediately defined with the value "4") is inserted with its designation 40 into that cell at the intersection of the row 4 in the first dimension which is assigned to the object within which the constant x has been declared, with one of the specific rows in the second dimension. Since, in this case, no external constant designated by name is specified for any of the program code, the entry in the associated cell 37 remains empty.

A further external constant z is likewise inserted, with its designation 40, into a cell 39. Here, however, in contrast to the constant x, mapping is carried out in the program code such that the constant y is assigned to the constant z. The constant z is thus inserted in the same specific row 18 in the second dimension as that which is also assigned to the constant y.

Furthermore, in this example, an object p0 has been defined, which carries out manipulation on the link si_2 which is derived from si_1 (see the 2$^{nd}$ program code above). This object is also provided with a row 4 in which the use of the constants ci as the designation 40 as well as the link of the object p0 to the signals si_1 as an interface definition with the designation 41 and si_2 as a calculation rule with the designation 43 [lacuna].

One of the designations of the interfaces, identified by the reference symbol 42, indicates a more complex structure than the other designations 8, 41 since, in addition to the identifier of the interface and of the data flow direction, details of the data type (in this case "bit") and the data type conversion function to be used are also made in this designation.

Overall, this results in an intermediate format table 1 which has a very clear form, in both examples, which can be converted easily by an automatic conversion program into interface definitions for an object program code, and which can also be made accessible for subsequent manual processing by a programmer/modeller or hardware or software engineer.

For example, the desired linking structure can be produced by removing and adding table entries. The interfaces for the present hierarchy level can be specified by declaration of rows to form port signals. Creation or modification of competing objects can be carried out by selecting the appropriate row in a separate text editor.

The intermediate format table according to the invention can also be used as such in order to carry out circuit planning, which can later lead to a program code (so-called top-down design). In this case, empty components can be generated first of all by inserting rows, for example columns. The links are then declared. Simple links between the adjacent objects can now be produced by inserting table entries, with the capability to generate the interfaces of the objects automatically. Once the top level of a design, for example of a hardware design, has been completed, the subcomponents can be refined further. A table which already contains all the interface signals can be produced automatically for this purpose.

The introduction of an intermediate format table and the method according to the invention for conversion allow a source code program to be converted into an object program code in a considerably simplified manner, reduce the number of conversion programs required, and provide a capability for clear monitoring of the conversion process, in the form of the intermediate format table. Once a source code program in a specific program language, for example VHDL, has been converted, it is even possible to carry out modifications to the desired design directly on the intermediate format table in order to convert these modifications back to the original programming language, for example VHDL, once again, and in order thus to obtain a modified design without any manipulations on the original program code. This thus allows the program to be edited without necessarily having to have any detailed knowledge of the respectively used programming language. In comparison with notation in a hardware description language, the individual information items relating to a design are not scattered over wide sections of the code, but are available in a clear and compact form in the intermediate format table.

As an extension to the proposed intermediate format table, VHDL generate statements could also be supported by being assigned, as specific attribute fields, to the corresponding rows in the first dimension. A wide field of use, in which variable constants and subroutines can be converted, is likewise created for non-hardware description languages. Participation of a sequential description into parallel-running processes is thus simplified, for example in real-time environments, multitasking operating systems and for "multithreaded" graphic user interfaces. In addition, data which are only written and never read can easily be identified, and can be removed from the data structure, if required. Overall, the proposed methods and the intermediate format table result in a major simplification in the conversion of program codes between different programming languages, and in the monitoring and subsequent processing of the conversion process, as well as providing further modification options during the conversion process.

I claim:

1. A method for converting interface definitions within a source code program into an intermediate format by a computer system which carries out the method, comprising the following steps:

identifying a plurality of objects, of which at least one object is an object in the source code program;

identifying at least one interface for each of at least two of the objects, wherein at least one of the interfaces is an input interface and at least one of the interfaces is an output interface;

identifying at least one link between at least two of the objects;

creating an at least two-dimensional intermediate format table with cells at intersections of rows disposed in a first dimension and rows disposed in a second dimension;

assigning designations for each of the objects in the source code program to a number of first rows in the first dimension, which is equal to the number of objects in the source code program;

assigning designations for each of the links to a number of first rows in the second dimension, which is equal to the number of links;

assigning the designation of the interface to each cell at an intersection of one of the first rows in the first dimension with one of the first rows in the second dimension, by which the object associated with the first row in the first dimension is connected to the link associated with the first row in the second dimensions;

whereby the intermediate format can be inspected and changed by a user.

2. The method as claimed in claim 1, wherein at least one of the links is an internal link.

3. The method as claimed in claim 1, wherein at least one of the links is an external link.

4. The method as claimed in claim 3, wherein in a first specific row in the first dimension, indicating a mode of an external interface of an at least one identified external link by assigning a designation of the mode to the cells which are located at the intersections of the first specific row in the first dimension and those of the first rows in the second dimension to which designations of the external links are assigned.

5. The method as claimed in claim 4, wherein each of the at least one external interface is an input interface, an output interface, a bidirectional interface or an interface with an undefined flow direction.

6. The method as claimed in claim 1, wherein in addition,
determining data types of the at least one identified interface;
in at least one second specific row in the first dimension, indicating the data types of the at least one identified interface, and assigning designations for the data types associated with the at least one identified link to cells at the intersections of one of the second specific rows in the first dimension and one of the first rows in the second dimension.

7. The method as claimed in claim 1, wherein in addition,
identifying at least one constant in at least one of the objects;
a data type of the at least one identified constant is determined;
in at least one third specific row in the first dimension the data type of the at least one constant is indicated;
in at least one first specific row in the second dimension, assigning a designation for the at least one constant; and
a designation of the data type is assigned to the cells at the intersection of one of the at least one third specific rows in the first dimension and one of the at least one first specific rows in the second dimension.

8. The method as claimed in claim 7, further comprising:
determining a value or a method of calculation of the at least one identified constant;
in at least one fourth specific row in the first dimension, indicating the value or the method of calculation of the at least one constant by assigning a designation of the value or the method of calculation to cells at intersections of one of the at least one fourth specific rows in the first dimension and one of the at least one first specific rows in the second dimension.

9. The method as claimed in claim 7, wherein at least one of the constants is an internal constant.

10. The method as claimed in claim 7, wherein at least one of the constants is an external constant.

11. The method as claimed in claim 1, further comprising:
determining a value or a method of calculation of at least one identified link;
in at least one fifth specific row in the first dimension, indicating the value or the method of calculation of the at least one identified link by assigning a designation of the value or the method of calculation of the at least one identified link to the cells at the intersections of one of the at least one fifth specific rows in the first dimension and one of the first rows in the second dimension.

12. The method as claimed in claim 1, wherein, in addition, identifiers originally from the source code program are identified and are inserted into cells of specific title rows.

13. The method as claimed in claim 12, wherein one designation originally from the source code program is the designation of one of the at least one objects in the source code program, at least one links or at least one constant.

14. The method as claimed in claim 1, wherein the designations of the at least one interface includes an identifier for the respective interface and at least one indication, which is a mode or a data type or a value of the interface or a data converting function which is to be applied to the interface.

15. The method as claimed in claim 1, wherein, in addition, designations, originally in the source code program, of the at least one interface are identified and are used as an identifier.

16. The method as claimed in claim 1, wherein the source code program is a code in a hardware description language.

17. The method as claimed in claim 16, wherein at least one object represents an interface entity of an electronic component.

18. The method as claimed in claim 16, wherein at least one internal link represents a signal.

19. The method as claimed in claim 16, wherein at least one external link represents a port.

20. The method as claimed in claim 1, wherein in addition,
at least one of the identified objects contains a sub source code program, which is converted into an intermediate format in the form of a sub format table;
in a cell of the row in the first dimension associated with the converted object a cross-reference to the sub format table is inserted.

21. The method as claimed in claim 1, wherein a cross-reference to at least one identified object which is stored as a separate unit as source code program is inserted into a cell of the row in the first dimension associated with the stored object.

22. A method for converting interface information from an intermediate format table into target program code by a computer system executing the method, which comprises:
providing an at least two-dimensional intermediate format table having cells at intersections of rows disposed in a first dimension and rows disposed in a second dimension, assigning designations for at least one object to at least one first row in the first dimension;
assigning designations for at least one link to at least one first row in the second dimension;
assigning designations of at least one interface to each cell at an-intersection of one of the first
rows in the first dimension and one of the first rows in the second dimension, by which the object associated with the first row in the first dimension is connected to the link associated with the first row in the second dimension;
creating at least one program code object on the basis of the information contained in the intermediate format table about the at least one object;
assigning internal interfaces to the at least one program code object on the basis of the information contained in the intermediate format table;
creating at least one link between program code objects on the basis of information contained in the intermediate format table about the internal links of the internal interfaces; and
assigning external interfaces to the at least one program code object on the basis of the information contained in the intermediate format table
whereby the intermediate format table can be inspected and changed by a user.

23. The method as claimed in claim 22, wherein at least one interface is an input interface and wherein at least one interface is an output interface.

24. The method as claimed in claim 22, wherein inserting data types of the at least one interface into at least one second specific row in the first dimension of the intermediate format table and designations of the data types associated with the at least one link into cells at intersections of one of the at least one second specific rows in the first dimension and one of the first rows in the second dimension for designation of the at least one link;

in addition, defining the data types of the interface assigned to the at least one program code object and associated with the at least one link.

25. The method as claimed in claim 22, wherein indicating in at least one third specific row in the first dimension of the intermediate format table data types of at least one constant;

indicating in at least one first specific row in the second dimension of the intermediate format table designations of the at least one constant;

associating designations of the data type of the respective constant with cells at the intersections of at least one third specific row in the first dimension and the at least one first specific row in the second dimension;

in addition, defining at least one constant in the at least one program code object or in a general part of the target program code.

26. The method as claimed in claim 25, wherein in at least one fourth specific row in the first dimension of the intermediate format table, a value or a method of calculation of the at least one constant is indicated by assigning the value or the method of calculation to the cells at the intersections of one of the at least one fourth specific rows in the first dimension and one of the at least one first specific rows in the second dimension;

in addition, the value or the method of calculation of the at least one constant is assigned to the at least one constant defined in the values program code.

27. The method as claimed in claim 25, wherein at least one of the constants is an internal constant.

28. The method as claimed in claim 25, wherein at least one of the constants is an external constant.

29. The method as claimed in claim 22, further comprising:

indicating data types of at least one constant in at least one third specific row in the first dimension of the intermediate format table;

indicating designations of the at least one constant in at least one first specific row in the second dimension of the intermediate format table;

associating designations for the data type of the respective constant with cells at the intersections of at least one third specific row in the first dimension and the at least one first specific row in the second dimension;

in addition, defining at least one constant in the at least one program code object and in a general part of the target program code.

30. The method as claimed in claim 22, wherein in at least one fifth specific row in the first dimension of the intermediate format table, a value or a method of calculation of the at least one link is indicated by assigning the designation of the value or the method of calculation to cells at the intersections of the at least one fifth specific raw in the first dimension and one of the first rows in the second dimension for the designation of the at least one link;

in addition, the value or the method of calculation of the at least one link is assigned to a link generated in the target program code.

31. The method as claimed in the claim 22, wherein designations of the at least one object, the at least one link or at least one constant are inserted into cells of specific title rows of the intermediate format table.

32. The method as claimed in the claim 22, wherein designations of the at least one object, the at least one link and at least one constant are inserted into cells of specific title rows of the intermediate format table.

33. The method as claimed in the claim 22, wherein in addition, the at least one program code object, the at least one link or at least one constant are named on the basis of the designations in the cells of specific title rows of the intermediate format table.

34. The method as claimed in the claim 22, wherein in addition, the at least one program code object, the at least one link and at least one constant are named on the basis of the designations in the cells of specific title rows of the intermediate format table.

35. The method as claimed in claim 22, wherein in at least one cell of the row in the first dimension of the intermediate format table associated with the object a cross-reference to a sub format table is inserted;

in addition, the program code object generated from the object is connected to a sub program code generated from the sub format table.

36. The method as claimed in claim 22, wherein in at least one cell of the row in the first dimension of the intermediate format table associated with an object, a cross-reference to a source code program stored as a separate unit is inserted;

in addition, the program code object generated from the object is linked to the source code program stored as a separate unit.

37. An apparatus, comprising a computer system to create an intermediate format table to store interface information in a computer system, which interface information is contained in a program code, wherein the intermediate format table includes:

at least two dimensions;

cells at intersections of rows disposed in a first dimension and rows disposed in a second dimension;

a number of first rows in the first dimension, which is equal to the number of at least one object in the program code, have designations for each of the objects assigned thereto;

a number of first rows in the second dimension, which is equal to the number of at least one link in the program code, have designations for each of the links assigned thereto; and each cell at an intersection of one of the first rows in the first dimension and one of the first rows in the second dimension have a designation of an interface assigned thereto by which the object associated with the first row in the first dimension is connected to the link associated with the first row in the second dimension whereby the intermediate format table storing specifically arranged interface information can be inspected and changed by a user.

38. The apparatus as claimed in claim 37, wherein at least one of the links is an internal link.

39. The apparatus as claimed in claim 37, wherein at least one of the links is an external link.

40. The apparatus as claimed in claim 37, wherein at least one of the interfaces is an internal interface.

41. The apparatus as claimed in claim 37, wherein at least one of the interfaces is an external interface.

42. The apparatus as claimed in claim 41, wherein a mode of the at least one external interface of the at least one external link is indicated in one first specific row in the first dimension of the intermediate format table by assigning a designation of the mode to cells at the intersections of the first specific row in the first dimension and the first rows in the second dimension to which designations of the external links are assigned.

43. The apparatus as claimed in claim 37, wherein in at least one second specific row in the first dimension, data types of the at least one interface are indicated by assigning a designation of the data types to cells at the intersections of one of the at least one second specific rows in the first dimension and one of the first rows in the second dimension.

44. The apparatus as claimed in claim 37, wherein in at least one third specific row in the first dimension, data types of at least one constant are indicated by assigning the designation of the data types to cells at the intersections of the at least one third specific row in the first dimension and one of at least one first specific rows in the second dimension for designation of the at least one constant.

45. The apparatus as claimed in claim 44, wherein in at least one fourth specific row in the first dimension, a value or a method of calculation of at least one constant is indicated by assigning the designation of the value or the method of calculation to cells at the intersections of one of the at least one fourth specific row in the first dimension and one of the at least one first specific rows in the second dimension.

46. The apparatus as claimed in claim 44, wherein at least one of the constants is an internal constant.

47. The apparatus as claimed in claim 44, wherein at least one of the constants is an external constant.

48. The apparatus as claimed in claim 37, wherein, in at least one fifth specific row in the first dimension, a value or a method of calculation of the at least one link is indicated by assigning the designation of the value or the method of calculation to cells at the intersections of the at least one fifth specific row and one of the first rows in the second dimension for designation of a link.

49. The apparatus as claimed in claim 37, wherein the designation of the at least one object, at least one link or at least one constant originally in the program code is inserted into cells of specific title rows.

50. The apparatus as claimed in claim 37, wherein the designations of the at least one object, the at least one link and at least one constant originally in the program code are inserted into cells of specific title rows.

51. The apparatus as claimed in claim 37, wherein each designation of one o£ the at least one interfaces includes an identifier for the respective interface, as well as at least one indication, wherein each of the indications is either a mode or a data type or a default value of the interface or a data converting function to be applied to the interface.

52. The apparatus as claimed in claim 37, wherein any desired cells of the intermediate format table include annotations, which serve to control programs for analyses of information contained in the intermediate format table.

53. The apparatus as claimed in claim 52, wherein the annotations are contained in at least one further dimension of the intermediate format table, specific types of annotations are assigned to rows in the further dimension, and at those intersections of the rows in the first dimension or the rows in the second dimension of the intermediate format table which govern the annotations with the row in the further dimension which is assigned to a specific type of annotation, an annotation is inserted.

54. The apparatus as claimed in claim 37, wherein any desired cells of the intermediate format table include annotations which serve as information for the user.

* * * * *